June 9, 1925. 1,541,358

J. E. JOHNSON

APPARATUS FOR MOLDING

Filed Sept. 20, 1922 2 Sheets-Sheet 1

INVENTOR
Joseph E. Johnson
BY
Mitchell Brothers,
ATTORNEYS.

June 9, 1925.

J. E. JOHNSON

APPARATUS FOR MOLDING

Filed Sept. 20, 1922

INVENTOR
Joseph E. Johnson
BY
Mitchell Brothers
ATTORNEYS.

Patented June 9, 1925.

1,541,358

UNITED STATES PATENT OFFICE.

JOSEPH E. JOHNSON, OF MERIDEN, CONNECTICUT, ASSIGNOR TO THE CONNECTICUT TELEPHONE & ELECTRIC COMPANY, INCORPORATED, OF MERIDEN, CONNECTICUT, A CORPORATION OF CONNECTICUT.

APPARATUS FOR MOLDING.

Application filed September 20, 1922. Serial No. 589,294.

*To all whom it may concern:*

Be it known that I, JOSEPH E. JOHNSON, a citizen of the United States of America, residing at Meriden, Connecticut, have invented a new and useful Apparatus for Molding, of which the following is a specification.

My invention relates to apparatus for for molding. The invention is particularly, though not exclusively, adapted for molding articles of the so-called cold moldable compositions, one example of which is disclosed in the Cavanagh Patent No. 1,346,397, dated July 13, 1920. Articles of the character indicated are extensively used for insulating parts in the electrical industries, such parts as plugs, sockets, etc., being cited by way of example.

Heretofore, in the process of molding, it has been common practice to measure volumetrically or weigh out the requisite quantity of material required for any specific molded article, and then the measured or weighed out quantity of moldable compound was poured into the die cavity, after which it was compressed into the molded article. Various means, such as automatic measuring and weighing apparatus, have been devised and used, but by whatever method the proper quantity was ascertained it required time, care and skill to get the proper quantity of moldable material into the die cavity. In molding machines as now generally used, the mold cavities are of considerably greater capacity than is required for holding the requisite quantity of moldable compound for any specific article.

It is the principal object of my invention, therefore, to provide apparatus for forming molded articles whereby the requisite amount of moldable compound for each article may be rapidly and accurately supplied to the mold cavity.

It is a more specific object to provide apparatus for molding, in which it is a relatively simple matter to vary and adjust the quantity of material to be compressed at each operation, and, in general, the object is to provide an improved and simplified apparatus for molding.

One form of apparatus for the accomplishment of the objects of my invention is disclosed in the accompanying illustrative drawings, in which—

Figure 1:
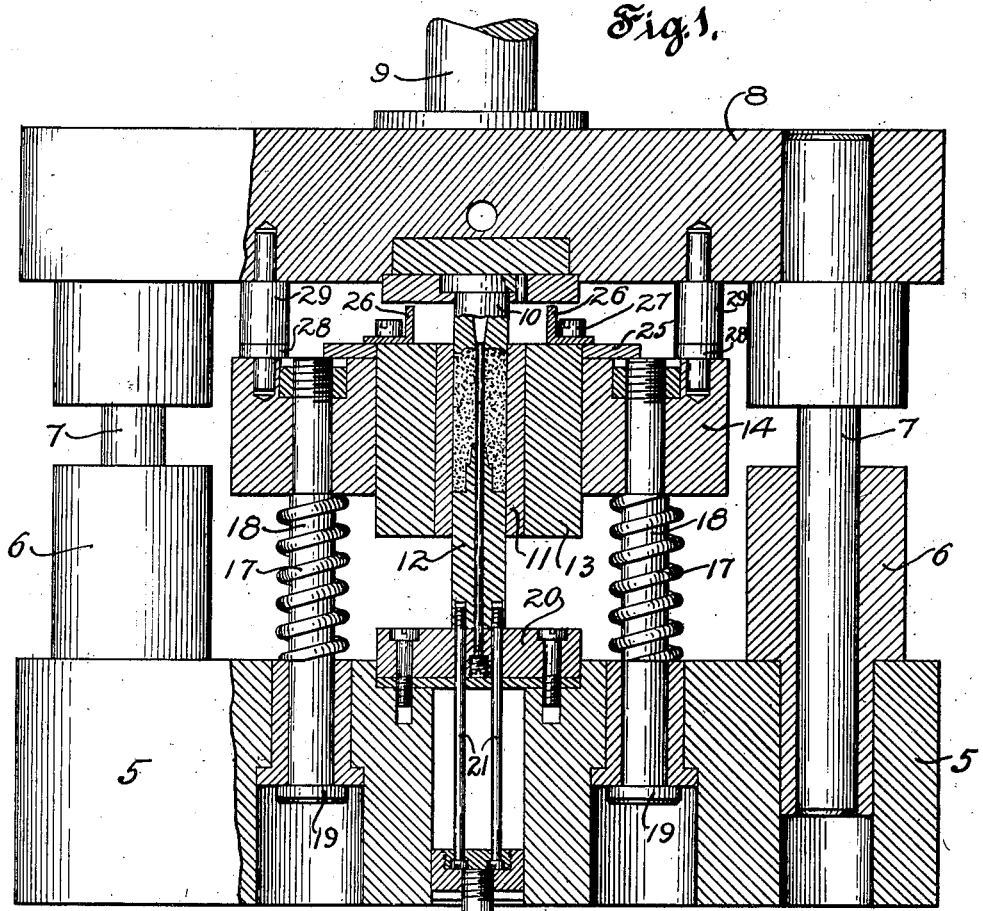
Figure 1 is a front vertical sectional view, parts being shown in elevation, of a molding press disclosing features of my invention, the parts being in position to begin compression.
Figure 2:
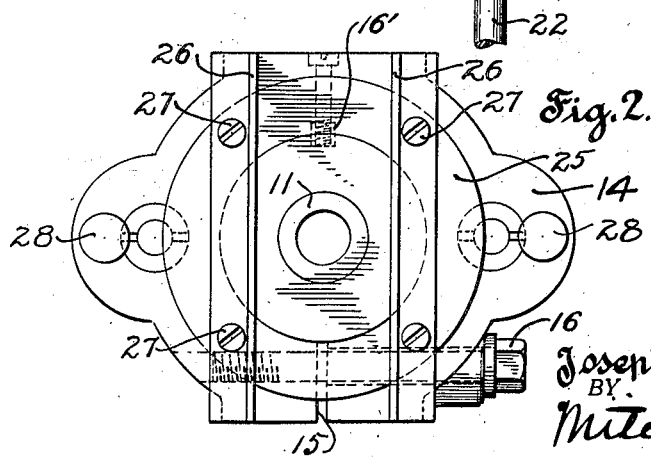
Fig. 2 is a detail view in plan of a die jacket and associated parts.

In said illustrative drawings, 5 indicates conventionally a base plate of a press on which may be mounted bearing bushings 6—6 for receiving guide rods 7—7 which may guide the holder plate 8. One of the parts may be reciprocated relatively to the other, and in the form shown the holder plate 8 is reciprocable by suitable means, such as the hydraulic ram 9. A die punch 10 is secured to the holder plate 8 and cooperates with a die jacket 11 defining a part of the mold cavity. The bottom of the mold cavity in the specific form shown is formed by the die pad 12 extending into the mold cavity in the die jacket 11. In the present disclosure the die jacket 11 is rigidly held by a bushing 13, which is in turn held by a holder block 14. The holder block is preferably split, as indicated at 15, and suitable means, such as the stud 16, may be provided for clamping the supporting block and the bushing 13 together. If desired, means, such as the spline 16', may be secured between the bushing and holder 14 to prevent relative rotation.

The die jacket is disclosed herein as resiliently supported by means of springs 17—17 bearing beneath the block 14 and on the frame 5. Guide rods 18—18 are secured to the holder block 14 and reciprocate in suitable guideways in the frame 5. In order to limit the upward movement of the holder block 14 the rods 18—18 may be provided with stop heads 19—19 abutting the frame 5.

The die pad 12 is preferably supported from the frame 5 and, in the form shown, a beam block 20 is secured to the frame and against which the die pad seats. One or more push rods 21 may be secured to the die pad and extend through the block 20. These rods might, in turn, be actuated by a rod 22 for raising the die pad to eject a molded article, as will later be described.

If desired, a cover plate 25 may be secured outside the die jacket and serves to prevent the compound for filling the cavity from falling down onto the base or other parts. In the form shown guide walls or retaining flanges 26—26 are secured at opposite sides of the die jacket, as by means of screws 27—27. These retaining flanges, as will be later described, are for the purpose of preventing spilling of compound while filling the die cavity.

Some part movable with the die jacket, for example, the holder block 14, may have abutments 28—28 for coaction with corresponding abutments 29—29 carried by the holder plate, and these abutments, as will be later described, are for moving the die jacket during at least a part of the compression stroke of the die punch.

30 indicates a hopper or support for moldable compound, and the sides, such as 31, of the hopper preferably fit between the retaining walls or flanges 26, so that material withdrawn from the hopper and along above the mold cavity will be prevented from being spilled and wasted. 32 indicates a secondary hopper, the side flanges 33 of which likewise preferably extend between the retaining walls or flanges 26—26. It will thus be seen that walls of the hoppers and the walls 26—26 substantially surround or enclose the top of the mold cavity so that material will not be spilled.

In the present disclosure the hoppers are fixedly mounted relatively to the frame 5, and during the reciprocation of the die jacket during compression of the molded article the die jacket and associated parts will move away from the hoppers. It is, of course, obvious that this arrangement is merely one form and that the hoppers might well be fastened to parts other than the fixed main frame.

The molding may be carried out as follows:

The holder plate and die punch are separated from the die jacket, and with the die pad in the present instance relatively fixed the stud 16 of the holder block 14 is loosened and the bushing 13, together with the die jacket 11, is moved until the capacity of the mold cavity formed by the die pad and die jacket will be such that when filled with compound substantially flush with the top thereof the requisite quantity for a molded article will be contained therein. The stud 16 is then again screwed up so as to rigidly clamp the bushing, and consequently the die jacket, in position.

It will be observed that, with the die punch elevated, the bushing and die jacket, together with the retaining walls 26, will be raised up so that (referring to Fig. 3) the bottoms of the hoppers may rest upon the cover plate 25 or other suitable part adjacent the mold cavity. The moldable compound from the supply hopper 30 is then withdrawn and passed over the mold cavity with a tool, such as a small hoe, and a surplus quantity is scraped off substantially flush with the top end of the mold cavity.

It is, of course, immaterial whether the scraping is done toward or away from the hopper 30, since any surplus scraped into the hopper 32 will be retained thereby.

Figure 3:
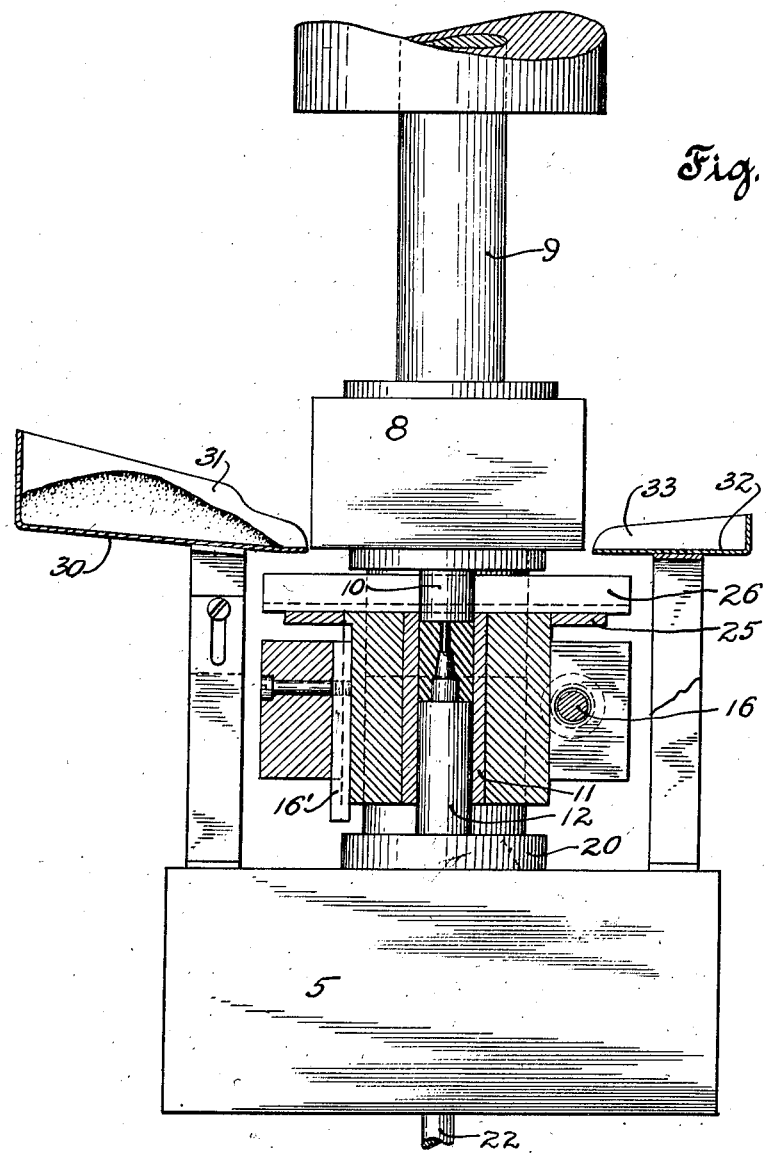
Fig. 3 is a side vertical sectional view, parts being shown in elevation, of the molding press shown in Fig. 1, the parts being in the positions occupied at the end of the compression stroke.

Now since the die pad and die jacket have been so adjusted that just the requisite amount of material will be contained in the mold cavity when the material is scraped off substantially flush with the top thereof, it will be seen that, upon the compression of the material in the cavity, a molded article will be formed. The hydraulic means is next actuated to cause the die punch to descend and co-act with the die jacket, for example, as shown in Fig. 1. At this point the abutments 28, 29 contact with each other, and further depression of the holder plate 8 will cause not only the die punch, but also the die jacket, to move down, the latter being moved against the compression springs 17—17. In Fig. 3 the parts are shown in position when the pressing operation is complete. The hydraulic means is then again actuated to release the holder plate 8, and the latter is suitably drawn upwardly, the die jacket moving upwardly with the holder plate until the heads 19 abut the frame 5, after which the die jacket is held stationary and the die punch is removed from the die jacket. The rod 22 may next be actuated (by means not shown), so as to cause the die pad 12 to eject the molded article from the die jacket. The die pad is then again lowered to the position indicated in Fig. 1, and the same operation as just described is again repeated. The surplus compound from the last filling may, of course, if desired, be scraped into the cavity before fresh material is withdrawn from the hopper 30.

It will be seen that by the method and the apparatus herein disclosed the exact quantity of moldable compound for any specific article is accurately and quickly determined. No separate weighing or measuring operation is necessary, since the material is accurately measured out into the mold cavity, where the compound is compressed into the molded article. Articles of uniform size and density may be produced very rapidly by the method herein disclosed.

Suitable inserts may, of course, be molded into the articles, if desired, these inserts usually being applied to the die pad or punch or both, as is common practice.

The present dies have not been shown as adapted for heating and cooling, but since such heated or cooled dies are very common in the art, it is obvious, without illustration, that heated or cooled dies may be used.

While I have disclosed a preferred form of apparatus, I wish it understood that the illustrated disclosure is merely by way of example, and that changes may be made within the scope of the appended claims.

I claim:

1. In a molding machine, a die jacket, a die pad, means for adjusting said jacket and pad in fixed position relatively to each other so as to form a mold cavity of such predetermined depth that when filled with compound substantially flush with the top thereof it will contain the requisite amount of material to form a molded article, said mold cavity being filled by passing moldable compound over the top thereof and scraping the compound off substantially flush with the top of the cavity, retaining means fixed relatively to said mold cavity for preventing spilling of the compound while the cavity is being filled, and means for compressing moldable compound in said cavity to form a molded article.

2. In a molding machine, a die jacket, a die pad co-acting therewith, said jacket and pad being movable relatively to each other, means for securing said jacket and pad in such adjusted position as to form a mold cavity of such predetermined capacity that when filled substantially flush with the top thereof the requisite quantity of moldable compound for a molded article will be contained therein, retaining walls at opposite sides of said die cavity and in fixed position relatively thereto and spaced a substantial distance from the adjacent edges of said cavity for preventing spilling of moldable compound when filling the cavity, and means for compressing moldable compound while in said cavity for forming a molded article.

3. In a molding machine, a die jacket, a die pad, said members being adjustable relatively to each other to various positions so as to form a die cavity of such capacity that when filled substantially flush with the top thereof the requisite amount of moldable compound for a molded article will be contained therein, means for fixing said die jacket and die pad in such adjusted position, a hopper for moldable compound adjacent said die cavity, and retaining walls fixedly mounted relatively to said cavity and spaced a substantial distance from the adjacent edges thereof for confining the compound taken from said supply and passed over said mold cavity for filling the latter, whereby spilling is prevented, and means for compressing moldable compound in said cavity for forming a moldable article.

4. In a molding machine, a die jacket, a die pad co-operating therewith, said die pad and die jacket being adjustable relatively to each other to various positions to form a die cavity of such predetermined depth that when filled substantially flush with the top thereof the requisite quantity of material for a molded article will be contained therein, means for supporting a supply of moldable compound for feeding to said die cavity, retaining means substantially enclosing said mold cavity at opposite sides at all times for preventing spilling of material when filling the cavity, and means for compressing moldable compound while in said cavity for forming a molded article.

5. In a molding machine, a die jacket, a die pad co-operating therewith, means for adjusting said die pad and die jacket to various positions relatively to each other for forming a mold cavity of such predetermined depth that when filled substantially flush with the top thereof the requisite quantity of compound will be contained therein to form a molded article, means for supporting a supply of moldable compound adjacent said cavity, a pair of upstanding walls fixedly mounted on opposite sides of said cavity to prevent spilling of moldable compound when compound is withdrawn from said supply and passed over the top of said mold cavity for filling the latter, and means for compressing moldable compound while in said cavity to form a molded article.

6. In a molding machine, a die jacket, a die pad, a holder block for said die jacket substantially surrounding the latter, means for adjusting said die jacket in said holder block for adjusting the jacket and pad relatively to each other to form a mold cavity of such predetermined capacity that when filled substantially flush with the top the requisite quantity of moldable compound for a molded article will be contained therein, means movable with said die jacket and having a surface flush with the top of said die jacket for increasing the area of the top of said jacket so as to form a surface for holding moldable compound, and means for compressing moldable compound while in said cavity for forming a molded article.

7. In a molding machine, a die jacket, a die pad, a bushing for holding said die jacket, a supporting block substantially surrounding said bushing, means for causing said bushing to be held in said supporting block, and a die punch for compressing moldable compound between said die pad and said punch.

8. In a molding machine, a die pad, a die jacket, a bushing supporting said die jacket, a supporting block substantially surrounding said bushing, means for clamping said bushing and supporting block to each other for supporting the die jacket in various adjusted positions relatively to said die pad, a die punch, and means for causing said die punch and die pad to be moved relatively to each other to compress the moldable compound while in said die jacket.

9. In a molding machine, a die pad, a die jacket co-operating therewith, resilient means for supporting said die jacket, said pad and jacket being adjustable relatively to each other to form a mold cavity of such predetermined depth that when filled substantially flush with the top thereof the requisite quantity of moldable compound for a molded article will be contained therein, a die punch, means for moving said die punch and die pad toward each other and abutments movable with said die punch and serving to move said resiliently supported die jacket with said punch and against said resilient means during the compressing operation for compressing moldable compound in said mold cavity.

10. In a molding machine, die jacket means, a supporting block for said die jacket, a spline coacting with said die jacket means and said block for preventing rotation between said die jacket means and supporting block, a die pad coacting with said die jacket means, and means for compressing moldable compound while in said die jacket means.

11. In a molding machine, a relatively fixed die pad, a die jacket movable relatively to said die pad, means for fixing said die jacket in various adjusted positions relatively to said die pad for forming a mold cavity of such predetermined depth that when filled substantially flush with the top thereof the requisite quantity of material for a molded article will be contained therein, and a die punch for compressing material in said die jacket, and means for positively moving said jacket with said die punch during the compression of material therein.

12. In a molding machine, a die pad, a die jacket movable relatively to said die pad, means for fixing said die pad and jacket in various adjusted relative positions whereby a mold cavity will be formed of such predetermined depth that when filled substantially flush with the top the requisite quantity of moldable material for a molded article will be contained therein, and an angle having an upstanding leg fixed at opposite sides of said die jacket cavity whereby said upstanding legs will serve as retaining walls to prevent spilling of material during the filling of said mold cavity.

13. In a molding machine, a base member, a die pad supported therefrom, jacket means co-operating with said die pad and resiliently supported from said base, means for preventing spilling of moldable compound when filling said mold cavity, a die punch, and means for moving said die punch toward said die pad for compressing moldable material in the mold cavity, means independent of said die punch for positively moving said die jacket with said die punch during at least a part of the compression stroke, and means for moving said die pad for ejecting the molded article from said die jacket.

14. In a device of the character described, a member having a mold cavity therein, said cavity being of a capacity to contain the requisite quantity of moldable compound for a molded article when the compound is scraped off substantially flush with the top of said cavity, said cavity being filled by supplying an excess of moldable compound thereto and scraping off the compound substantially flush with the top of said cavity, and retaining walls fixedly mounted relatively to said cavity for confining the compound scraped off above said cavity.

15. In a device of the character described, a member having a mold cavity therein, said cavity being of a capacity to contain the requisite quantity of moldable compound for a molded article when the compound is scraped off substantially flush with the top of said cavity, a hopper for holding a supply of moldable compound, retaining walls fixedly mounted relatively to said cavity for confining compound withdrawn from said supply and passed over said mold cavity, and means for pressing the compound while in said mold cavity.

JOSEPH E. JOHNSON.